United States Patent
Yasui

(10) Patent No.: US 12,486,923 B2
(45) Date of Patent: Dec. 2, 2025

(54) SPOOL POSITION ESTIMATION APPARATUS, AIRCRAFT HYDRAULIC ACTUATOR APPARATUS, SPOOL POSITION ESTIMATION METHOD, AND SPOOL POSITION ESTIMATION PROGRAM

(71) Applicant: NABTESCO CORPORATION, Tokyo (JP)

(72) Inventor: Tsutomu Yasui, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/368,532

(22) Filed: Jul. 6, 2021

(65) Prior Publication Data

US 2022/0003334 A1 Jan. 6, 2022

(30) Foreign Application Priority Data

Jul. 6, 2020 (JP) ................. 2020-116649

(51) Int. Cl.
*F16K 37/00* (2006.01)
*F16K 31/06* (2006.01)
*G01D 5/243* (2006.01)

(52) U.S. Cl.
CPC .......... *F16K 37/0041* (2013.01); *F16K 31/06* (2013.01); *G01D 5/243* (2013.01)

(58) Field of Classification Search
CPC ...... F16K 37/0041; F16K 31/06; G01D 5/243
See application file for complete search history.

(56) References Cited

U.S. PATENT DOCUMENTS 7,622,821 B2 * 11/2009 Mehrer .................. H02J 4/00
244/75.1

FOREIGN PATENT DOCUMENTS

| EP | 1302952 A | 4/2003 | |
|---|---|---|---|
| JP | H0545395 A | 2/1993 | |
| JP | H09014486 A | 1/1997 | |
| JP | 2981835 B2 * | 11/1999 | |
| JP | 2003086422 A * | 3/2003 | |
| JP | 2005317612 A | 11/2005 | |
| JP | 6502554 B1 | 4/2019 | |
| JP | 2019199944 A * | 11/2019 | ......... F16K 31/0613 |
| KR | 1020050101363 A | 10/2005 | |
| WO | WO-2018074015 A1 * | 4/2018 | ............. G05B 17/02 |

OTHER PUBLICATIONS

EPO Extended European Search Report for corresponding EP Application No. 21183912.1; Issued on Jan. 7, 2022.
(Continued)

*Primary Examiner* — Angelisa L. Hicks
(74) *Attorney, Agent, or Firm* — CANTOR COLBURN LLP

(57) ABSTRACT

A position estimation apparatus includes: a supplying unit that supplies a high-frequency signal Sh to a solenoid for driving a spool of an electromagnetic valve; an acquisition unit that acquires electrical information Je related to the solenoid supplied with the high-frequency signal Sh, and an estimation unit that estimates a position of the spool based on a result of comparison between the electrical information Je acquired by the acquisition unit and the high-frequency signal Sh supplied from the supplying unit.

8 Claims, 6 Drawing Sheets

(56) References Cited

OTHER PUBLICATIONS

Fazlur Muhammad Rahman, et al. "Position Estimation in Solenoid Actuators," IEEE Transactions on Industry Applications, vol. 32, No. 3, May/Jun. 1996; 8 Pages.
JPO Notification of Reasons for Refusal for corresponding JP Application No. 2020-116649; Dated Apr. 30, 2024; 4 pages.

* cited by examiner

| SPOOL POSITION Ps | AMPLITUDE DIFFERENCE Cp | INVERSE ELECTROMO- TIVE FORCE Eb | DRIVING CURRENT Ic |
|---|---|---|---|
| Ps(0) | Cp(0) | Eb(0) | Ic(0) |
| Ps(1) | Cp(1) | Eb(2) | Ic(2) |
| Ps(2) | Cp(2) | Eb(3) | Ic(3) |
| ● | ● | ● | ● |
| ● | ● | ● | ● |

DATA SET 32n

SPOOL POSITION ESTIMATION APPARATUS, AIRCRAFT HYDRAULIC ACTUATOR APPARATUS, SPOOL POSITION ESTIMATION METHOD, AND SPOOL POSITION ESTIMATION PROGRAM

CROSS REFERENCE TO RELATED APPLICATION

The present invention claims priority under 35 U.S.C. § 119 to Japanese Application No. 2020-116649 filed Jul. 6, 2020, the entire content of which is incorporated herein by reference.

BACKGROUND OF THE INVENTION

Field of the Invention

The present invention relates to a spool position estimation apparatus, aircraft hydraulic actuator apparatus, spool position estimation method, and spool position estimation program.

Description of the Related Art

Patent literature 1 discloses an electromagnetic changeover valve used in a hydraulic system. The electromagnetic changeover valve is configured such that the position of the valve spool that moves in coordination with a moving core is displaced in the axial direction by sucking and moving the movable core to a fixed core by energizing and exciting the coil of a solenoid, thereby switching port connection, and switching the flow channel of the hydraulic circuit. The electromagnetic changeover valve is provided with a solenoid at one end of the valve spool. The valve spool is moved to a predetermined position along with the moving core in accordance with the condition of energization of the solenoid.

[Patent literature 1] JP Patent 6502554

SUMMARY OF THE INVENTION

A switching mechanism embodied by an electromagnetic valve driven by a solenoid is used to switch the mode of a hydraulic actuator. The spool position of the electromagnetic valve may be shifted from a target position due to, for example, to an external force exerted on the spool, which may make result in incomplete mode switching. A position sensor for sensing the spool position may be attached. However, this approach is disadvantageous from the perspective of size and weight reduction because the number of components is increased.

The electromagnetic valve disclosed in Patent Literature 1 is comprised of a combination of a large number of constituting elements. Since the configuration is complicated, it cannot be said that the requirement for size and weight reduction can be fully met.

The present invention addresses the above-described issue, and an illustrative purpose thereof is to provide a spool position estimation apparatus capable of estimating a spool position of an electromagnetic valve with a simple configuration.

A spool position estimation apparatus according to an embodiment of the present invention includes: a supplying unit that supplies a high-frequency signal to a solenoid for driving a spool of an electromagnetic valve; an acquisition unit that acquires electrical information related to the solenoid supplied with the high-frequency signal, and an estimation unit that estimates a position of the spool based on a result of comparison between the electrical information acquired by the acquisition unit and the high-frequency signal supplied from the supplying unit.

Optional combinations of the aforementioned and replacement of constituting elements or implementation of the present invention in the form of methods, apparatuses, programs, transitory or non-transitory recording mediums storing programs, systems, etc. may also be practiced as optional modes of the present invention.

According to the present invention, it is possible to provide a spool position estimation apparatus capable of estimating the spool position of an electromagnetic valve with a simple configuration.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
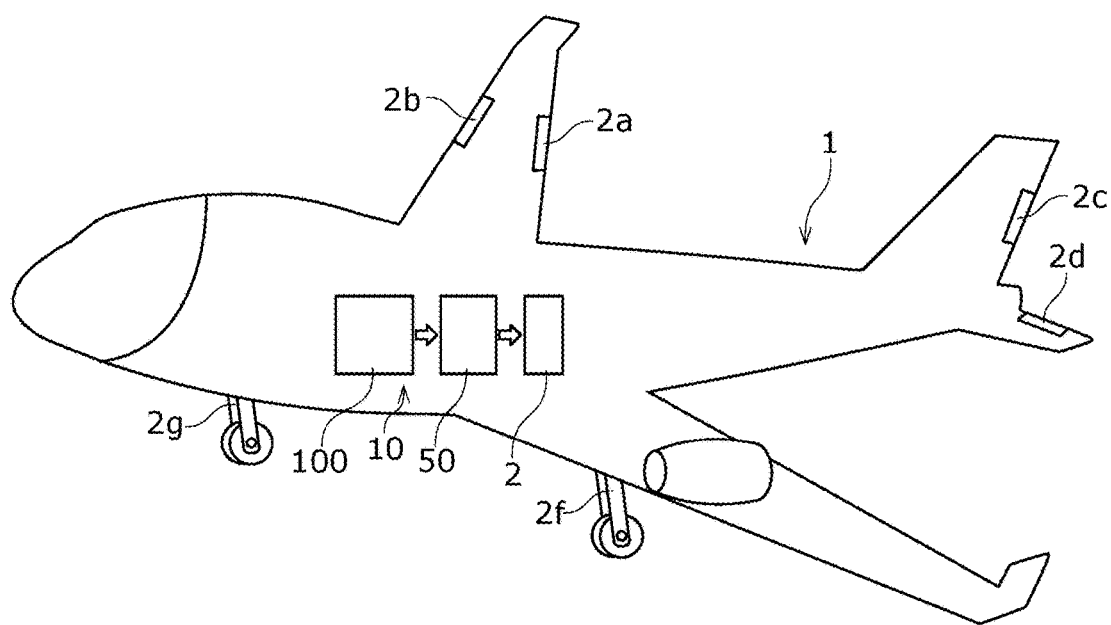
FIG. 1 schematically shows an actuator apparatus provided with the position estimation apparatus according to the first embodiment.

A summary of the present disclosure will be presented. For example, a switching mechanism embodied by an electromagnetic valve including a solenoid may be used to switch the mode of a hydraulic actuator. In a configuration in which the position of the movable part (e.g., moving core) of the solenoid is not sensed, whether the mode of the hydraulic actuator is actually switched or not is figured out from the behavior of the actuator. In this case, whether the mode is properly switched or not cannot be confirmed until the actuator is actually operated. Therefore, a latent failure mode may be induced.

A position sensor may be used to sense the spool position of the electromagnetic valve. For example, a position sensor such as a linear variable differential transformer (LVDT), a linear potentiometer, etc. may be added to the solenoid to measure the spool position and check whether the mode of the hydraulic actuator is switched properly. In this case, addition of a position sensor such as LVDT and a peripheral electronic circuit for sensing the spool position may make the structure complicated, increase the weight, and increase the size. Also, an increase in the number of components creates a concern that the hydraulic oil may be leaked, and the reliability and cost performance may be deteriorated.

We have devised a technology of sensing the spool position of an electromagnetic valve without using a position sensor such as LVDT from the perspective of improving the cost and failure rate by reducing the number of components and of improving the reliability. In this technology, a high-frequency signal is supplied to the solenoid for driving the spool of the electromagnetic valve. Electrical information related to the solenoid supplied with the high-frequency signal is acquired. The position of the spool is estimated based on a result of comparison between the acquired electrical information and the high-frequency signal supplied from the supplying unit. The spool moves in coordination with the movable part so that the spool position can be estimated from the position of the movable part. In this case, the spool position can be estimated with a simple configuration.

The high-frequency signal can be superimposed on the driving voltage for driving the solenoid. The electrical information related to the solenoid may be the driving voltage and the driving current for driving the solenoid, the inverse electromotive force generated in the solenoid, etc. These electrical information items vary depending on the relative position between the solenoid coil and the movable part. Therefore, the spool position can be estimated by comparing the inverse electromotive force and the amplitude and phase of the current with the original high-frequency signal. Further, since the inverse electromotive force is substantially proportional to the moving speed of the spool, it is possible to know the condition of deterioration of the electromagnetic valve by referring to the variation of the inverse electromotive force. In further accordance with this technology, it is possible to estimate the moving speed of the movable part and so it is possible to estimate the mass and load of the driven body. The configuration of the present disclosure will be described in detail with reference to embodiments.

Hereinafter, the invention will be described based on preferred embodiments with reference to the accompanying drawings. In the embodiments and variations, identical or like constituting elements and members are represented by identical symbols and a duplicate description will be omitted. The dimension of members in the drawings are enlarged or reduced as appropriate to facilitate understanding. Those of the members that are not important in describing the embodiment are omitted from the drawings.

Terms including ordinal numbers (first, second, etc.) are used to explain various constituting elements, but the terms are used merely for the purpose of distinguishing one constituting element from the other constituting elements and shall not limit the constituting elements.

First Embodiment

A position estimation apparatus 100 according to the first embodiment of the present invention will be described with reference to FIG. 1 and FIG. 2. FIG. 1 schematically shows an actuator apparatus 10 provided with the position estimation apparatus 100. The usage of the actuator apparatus 10 is not limited, and the actuator apparatus 10 can be used as any of a variety of power sources for generating a driving source by hydraulic pressure or pneumatic pressure. In the example of FIG. 1, the actuator apparatus 10 is used as an apparatus for applying a driving force to at least one driven body 2 selected from a rudder surface of a tailplane of an airplane 1, a movable plane of a main plane, and a landing gear that supports wheels for landing. The movable plane of the main plane is exemplified by an aileron 2a and a flap 2b of the main plane. The rudder surface of the tailplane is exemplified by a rudder 2c, an elevator 2d, etc. of the tailplane. The landing gear that supports the wheels for landing is exemplified by a main gear 2f provided in the main plane, a body landing gear 2g provided in the body, etc.

Figure 2:
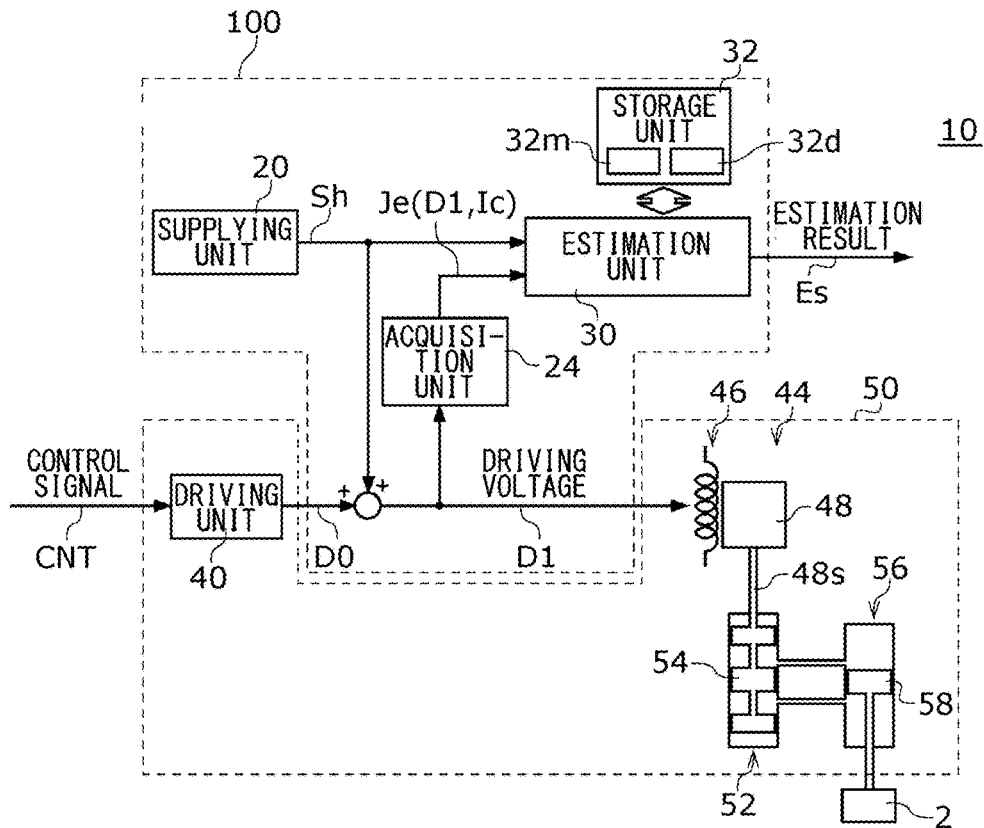
FIG. 2 is a block diagram showing the actuator apparatus of FIG. 1.

FIG. 2 is a block diagram showing an actuator apparatus 10. The actuator apparatus 10 includes a position estimation apparatus 100 and a valve unit 50. The valve unit 50 includes a driving unit 40, an electromagnetic valve 52, and a hydraulic actuator 56. The electromagnetic valve 52 includes a solenoid 44 and a spool 54 and may be referred to as a solenoid valve. The hydraulic actuator 56 include a piston 58.

The driving unit 40 functions as a diving circuit that outputs a driving voltage D0 to drive the solenoid 44 of the electromagnetic valve 52 based on a control signal CNT supplied from a superior control system. The driving voltage D0 may be an AC voltage or a DC voltage having an amplitude that varies in accordance with the control signal CNT. The driving voltage D0 of this embodiment is a PWM voltage having a duty ratio that varies in accordance with the control signal CNT. A high-frequency signal Sh described later is superimposed on the driving voltage D0 to produce a driving voltage D1.

The solenoid 44 includes a coil 46 and a movable part 48. The spool 54 is coupled to the movable part 48 via a shaft 48s and is moved in association with the movement of the movable part 48. When the driving voltage D1 is supplied, a driving current flows in the coil 46 of the solenoid 44 in accordance with the driving voltage D1. As the driving current flows in the coil 46, a magnetic field is generated inside the coil 46. When the coil 46 generates a magnetic field, the movable part 48 moves in a direction (downward in the figure) that pushes out the spool 54 via the shaft 48s and moves in the opposite direction (upward in the figure) due to the biasing force of a spring (not shown) in the absence of the magnetic field. In other words, the position of the spool 54 (hereinafter, "spool position") changes in accordance with the driving voltage D1 in coordination with the position of the movable part 48. The electromagnetic valve 52 controls the hydraulic actuator 56 by switching the channel of supplying hydraulic pressure in response to a change in the spool position. The hydraulic actuator 56 is controlled by the electromagnetic valve 52 to apply a hydraulic pressure to the piston 58 and drive the driven body 2 coupled to the piston 58.

The position estimation apparatus 100 estimates the position of the spool of the electromagnetic valve 52. The superior control system changes the control signal CNT in accordance with an estimation result Es from the position estimation apparatus 100. When the amount of change of the spool position is insufficient, for example, the superior control system controls the driving unit 40 to increase the driving force of the solenoid 44.

As shown in FIG. 2, the position estimation apparatus 100 is provided with a supplying unit 20, an acquisition unit 24, and an estimation unit 30. The supplying unit 20 supplies a high-frequency signal Sh to the solenoid 44 that drives the spool 54 of the electromagnetic valve 52. The acquisition unit 24 acquires electrical information Je related to the solenoid 44 supplied with the high-frequency signal Sh. The estimation unit 30 estimates the position of the spool 54 by referring to a result of comparison between the electrical information Je acquired by the acquisition unit 24 and the high-frequency signal Sh supplied from the supplying unit 20. The result of comparison between the electrical information Je and the high-frequency signal Sh is exemplified by an amplitude difference Cp described later.

Figure 3:
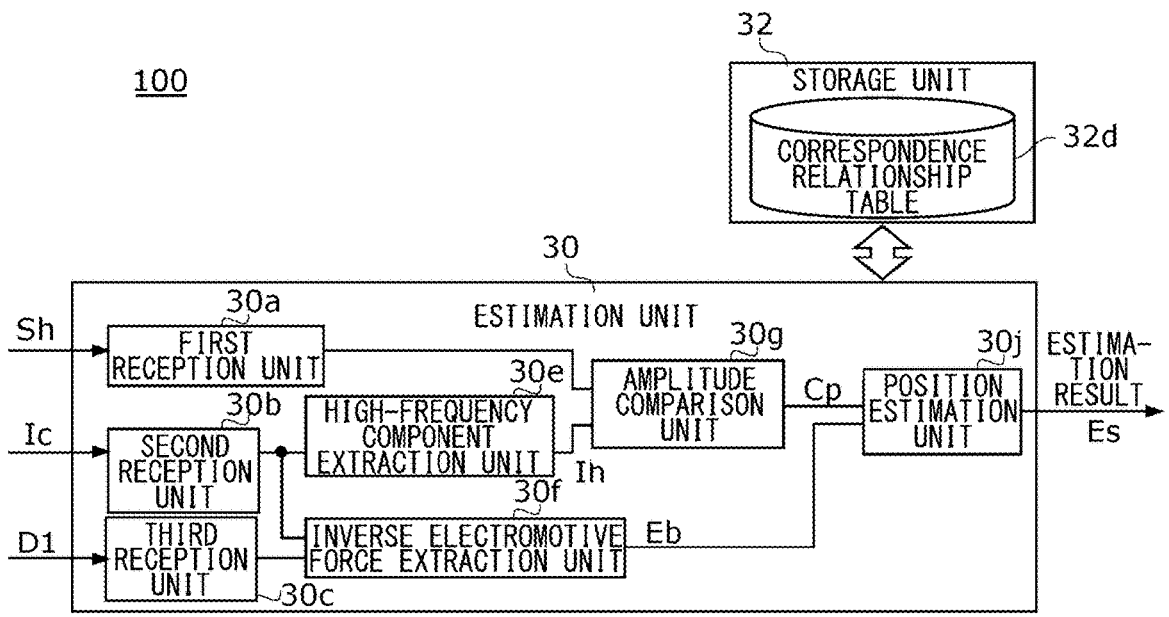
FIG. 3 is a block diagram showing the estimation unit of FIG. 2.

FIG. 3 is a block diagram showing the estimation unit 30. The functional blocks depicted in FIG. 3 and elsewhere are implemented in hardware exemplified by electronic devices or mechanical components such as a CPU of a computer, and in software such as a computer program. FIG. 3 depicts functional blocks implemented by the cooperation of these elements. Therefore, it will be understood by those skilled in the art that the functional blocks may be implemented in a variety of manners by a combination of hardware and software.

Figure 4:
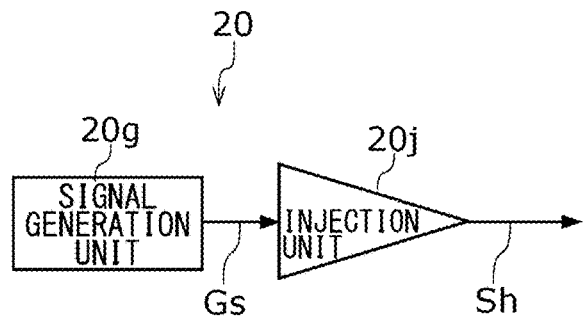
FIG. 4 is a block diagram showing the supplying unit of FIG. 2.

FIG. 4 is a block diagram showing the supplying unit 20. The supplying unit 20 includes a signal generation unit 20g and a signal injection unit 20j. The signal generation unit 20g generates a source signal Gs originating the high-frequency signal Sh. The signal injection unit 20j amplifies the source signal Gs and superimposes the amplified signal on the driving voltage D0. The high-frequency signal Sh can have any of a variety of waveforms such as a sinusoidal wave, a rectangular wave, and a staircase wave that varies stepwise between three or more levels. The high-frequency signal Sh of this embodiment is a sinusoidal wave or a rectangular wave. The sinusoidal wave is not limited to a strictly sinusoidal wave and may encompass a waveform referred to a triangular wave or a trapezoidal wave.

Figure 5:
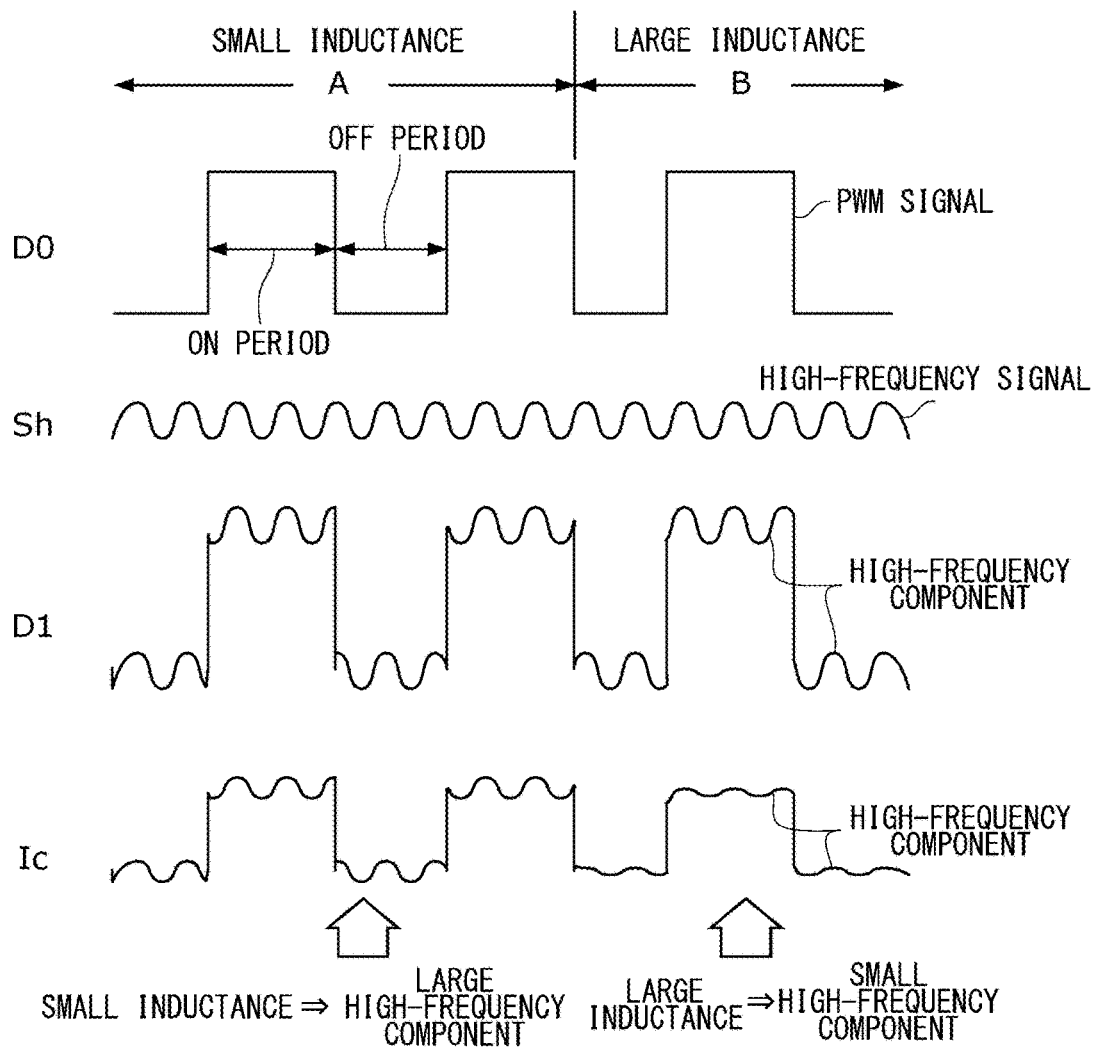
FIG. 5 shows a waveform chart showing examples of the high-frequency signal and the driving voltage.

FIG. 5 shows a waveform chart showing examples of the driving voltage D0, the high-frequency signal Sh, the driving voltage D1, and the current waveform Ic. The current waveform Ic is a current waveform of a driving current caused by the driving voltage D1 to flow in the coil 46 and is produced by the driving voltage D1. In this example, the driving voltage D0 is a PWM waveform having a high level and a low level, and the high-frequency signal Sh is a sinusoidal wave. The high level represents an ON period of the driving unit 40, and the low level represents an OFF period of the driving unit 40. The driving voltage D1 is superimposed on at least one of the high level and the low level of the driving voltage D0. The amplitude of the high-frequency signal Sh is configured to be smaller than the driving voltage D0. The frequency of the high-frequency signal Sh is set to a level that the solenoid 44 cannot respond to.

The high-frequency component of the current waveform Ic produced by the high-frequency signal Sh varies in accordance with the magnitude of the inductance of the coil 46. For example, the amplitude of the high-frequency component of the current waveform Ic is large when the movable part 48 is distanced from the coil 46 and the inductance of the coil 46 is small (zone indicated A in FIG. 5). The amplitude of the high-frequency component of the current waveform Ic is small when the movable part 48 is proximate to the coil 46 and the inductance of the coil 46 is large (zone indicated by B in FIG. 5). Therefore, the position of the movable part 48 relative to the coil 46 (i.e., spool position) can be estimated by referring to the magnitude of the amplitude of the high-frequency component of the current waveform of the driving current Ic.

As shown in the example of FIG. 5, it is desired that the repetition frequency of the PWM waveform be longer than the repetition frequency of the high-frequency signal Sh. By way of one example, the frequency of the high-frequency signal Sh may be 10 kHz or higher when the frequency of the PWM waveform is 6 kHz-8 kHz. The frequency of the high-frequency signal Sh is preferably twice the frequency of the PWM waveform or higher and, more preferably, four times the PWM frequency or higher and, still more preferably, ten times the PWM frequency or higher. If the frequency of the high-frequency signal Sh is excessively high, the operation of the estimation unit 30 may not be able to catchup, and a false operation may result. For this reason, the frequency of the high-frequency signal Sh may be 100 kHz or lower.

The acquisition unit 24 in this example acquires, as the electrical information Je, the driving voltage D1 and the driving current Ic flowing in the coil 46. Any of various current sensors like a direct-current current transformer (DCCT) and a current sense resistor can be employed as a sensor for sensing the driving current Ic. In the embodiment, a Hall element current sensor that converts a magnetic field produced around the driving current Ic into a voltage by utilizing Hall effect is used. This is advantageous in that an output proportional to the current ranging from a DC current to a high-frequency current can be obtained.

As shown in FIG. 3, the estimation unit 30 includes a first reception unit 30a, a second reception unit 30b, a third reception unit 30c, a high-frequency component extraction unit 30e, an inverse electromotive force extraction unit 30f, an amplitude comparison unit 30g, and a position estimation unit 30j. The first reception unit 30a receives the high-frequency signal Sh from the supplying unit 20. Of the electrical information Je acquired by the acquisition unit 24, the second reception unit 30b receives the driving current Ic. Of the electrical information Je acquired by the acquisition unit 24, the third reception unit 30c receives the driving voltage D1. The high-frequency component extraction unit 30e is a digital filter that extracts a frequency component Ih of the high-frequency signal Sh from the driving current Ic. By way of one example, the frequency component Ih can be extracted by using Fourier transform.

The inverse electromotive force extraction unit 30f extracts an inverse electromotive force Eb from the driving current Ic and the driving voltage D1. By way of one example, the inverse electromotive force Eb can be extracted through computation to obtain a difference between a result of multiplying the resistance value of the coil 46 by the driving current Ic (voltage drop) and the driving voltage D1. The amplitude comparison unit 30g compares the amplitude of the high-frequency signal Sh with the amplitude of the frequency component Ih and identifies an amplitude difference Cp therebetween. The amplitude comparison unit 30g can be configured by using a publicly known amplitude comparator. The position estimation unit 30j identifies the estimation result Es showing the spool position by referring to the amplitude difference Cp and using the correspondence relationship table 32d.

A storage unit 32 stores a correspondence relationship table 32d showing correspondence relationship between a position Ps of the spool 54 acquired in advance and the electrical information Je related to the solenoid 44 corresponding to the position Ps. The position Ps and the electrical information Je can be acquired in advance by an experiment, simulation, or a combination thereof. The storage unit 32 may be included in the estimation unit 30 or provided to be separate from the estimation unit 30 and connected to a publicly known information transmitting mechanism. One storage unit 32 may be provided in association with one position estimation apparatus 100. Alternatively, one storage unit 32 may be provided in association with a plurality of position estimation apparatuses 100.

Figures 6, 7:
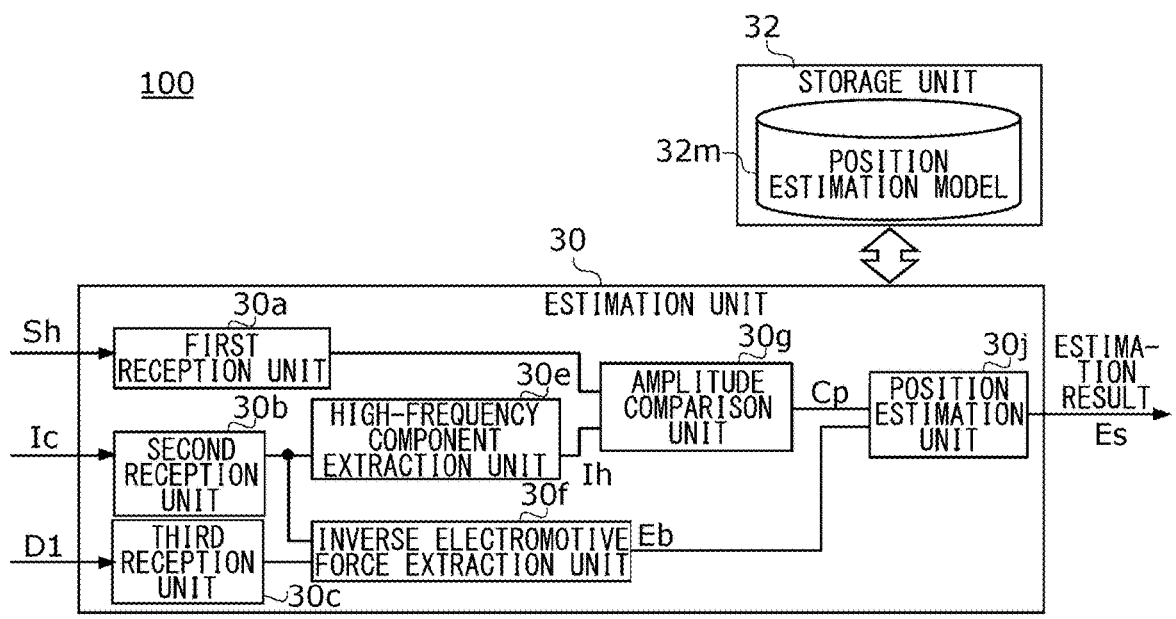
FIG. 6 schematically shows data in the correspondence relationship table of FIG. 3.
FIG. 7 is a block diagram showing another example of the estimation unit.

The correspondence relationship table 32*d* will be described with reference to FIG. 6. FIG. 6 schematically shows data in the correspondence relationship table 32*d*. Through our study, it has been discovered that there is certain correlation between the amplitude difference Cp and the position of the movable part 48 (spool position) since the inductance of the coil 46 varies and the amplitude of the driving current Ic responsive to the driving voltage D1 varies in accordance with the relative positions of the coil 46 and the movable part 48.

The correspondence relationship table 32*d* of the embodiment shows correspondence relationship between the amplitude difference (Cp(0), Cp(1), . . . ) and the inverse electromotive force (Eb(0), Eb(1), . . . ) corresponding to the spool position (Ps(0), Ps(1), . . . ) measured in advance. The correspondence relationship table 32*d* can be generated based on measurement values determined by an experiment in advance. For example, a sensor for sensing the position of the spool 54 may be attached to the electromagnetic valve 52, and the electromagnetic valve 52 may be activated to measure, while varying the spool position Ps, the amplitude difference Cp and the inverse electromotive force Eb corresponding to the spool position Ps.

The position estimation unit 30*j* refers to the correspondence relationship table 32*d*, using the amplitude difference Cp as a key, to determine the spool position Ps. In this example, the position estimation unit 30*j* also refers to the correspondence relationship table 32*d*, using the inverse electromotive force Eb as a key, to determine the spool position Ps. The position estimation unit 30*j* may output one of the spool position Ps identified from the amplitude difference Cp and the spool position Ps identified from the inverse electromotive force Eb as the estimation result Es or output both as the estimation result Es. In the embodiment, the position estimation unit 30*j* outputs an average of the the spool position Ps identified from the amplitude difference Cp and the spool position Ps identified from the inverse electromotive force Eb as the estimation result Es. Since the spool position Ps is estimated based on a plurality of electrical information items, the estimation precision is high. Moreover, the inverse electromotive force Eb is substantially proportional to the moving speed of the movable part 48 so that the condition of deterioration of the electromagnetic valve 52, the condition of load thereon, etc. can be known from the variation of the inverse electromotive force Eb.

Figures 8, 9:
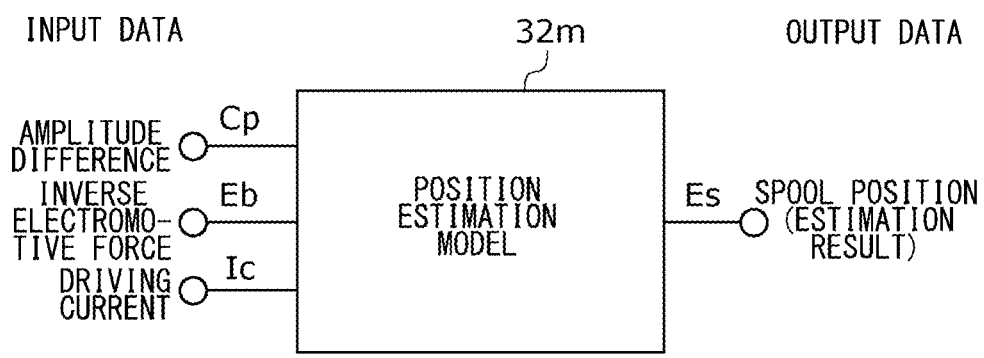
FIG. 8 schematically shows a data set of the position estimation model of FIG. 7.
FIG. 9 schematically shows the position estimation model of FIG. 7.

Another example of the estimation unit 30, which estimates the spool position Ps by using a position estimation model 32*m*, will be described with reference to FIGS. 7, 8, and 9. FIG. 7 is a block diagram showing another example of the estimation unit 30 and corresponds to FIG. 3. FIG. 8 schematically shows a data set 32*n* of the position estimation model 32*m*. FIG. 9 schematically shows the position estimation model 32*m*. The position estimation unit 30*j* of FIG. 7 differs from the example of FIG. 3 in that the position estimation model 32*m* is used instead of the correspondence relationship table 32*d* to estimate the spool position Ps, and the other features are equal.

The position estimation model 32*m* is generated in advance by machine learning, based on the spool position Ps and the electrical information Je related to the solenoid 44 corresponding to the spool position Ps. In this example, a data set 32*n*, comprised of the spool position (Ps(0), Ps(1), . . . ), the amplitude difference (Cp(0), Cp(1), . . . ), the inverse electromotive force (Eb(0), Eb(1), . . . ), and the driving current (Ic(0), Ic(1), . . . ) acquired in advance, is defined as shown in FIG. 9. The position estimation model 32*m* is generated through machine learning (supervised learning) by using the data set 32*n* as training data.

The position estimation model 32*m* can be generated by using a publicly known machine learning scheme such as a support vector machine, a neural network (including deep learning), a random forest, etc. The position estimation model 32*m* is stored in the storage unit 32. The position estimation model 32*m* may be generated based on actual measurement values of the electromagnetic valve 52 or generated based on past actual measurement values collected for solenoid valves of the same type.

The position estimation unit 30*j* feeds, as shown in FIG. 9, the amplitude difference Cp, the inverse electromotive force, the driving current Ic, which are newly acquired, to the position estimation model 32*m* as input data. The position estimation unit 30*j* obtains the spool position Ps as output data from the position estimation model 32*m*. The position estimation unit 30*j* outputs the spool position Ps obtained from the position estimation model 32*m* as the estimation result Es.

A description will be given of the feature of the position estimation apparatus 100 according to this embodiment configured as described above. The position estimation apparatus 100 includes the supplying unit 20 that supplies the high-frequency signal Sh to the solenoid 44 for driving the spool 54 of the electromagnetic valve 52, the acquisition unit 24 that acquires the electrical information Je related to the solenoid 44 supplied with the high-frequency signal Sh, and the estimation unit 30 that estimates the position of the spool 54 based on the result of comparison between the electrical information Je acquired by the acquisition unit 24 and the high-frequency signal Sh supplied from the supplying unit 20.

According to this configuration, the spool position of the electromagnetic valve can be estimated by using a simple configuration without using a position sensor. Therefore, the configuration is advantageous to reduce the size and weight. Further, the position is estimated based on a relative comparison result so that the impact from the variation of the high-frequency signal is canceled out, and the estimation precision is prevented from dropping. Still further, it is possible to estimate whether the mode of the hydraulic actuator is switched with high precision so that oversight of a latent failure mode can be prevented.

The position estimation apparatus 100 is provided with the storage unit 32 that stores information on the correspondence relationship between the position Ps of the spool 54 acquired in advance and the electrical information Je related to the solenoid 44 corresponding to the position Ps. The estimation unit 30 estimates the position Ps of the spool 54 by using the correspondence relationship information. In this case, the position is estimated by using the correspondence relationship information stored in advance so that high estimation precision is obtained.

The position estimation apparatus 100 is provided with the storage unit 32 that stores the position estimation model 32*m* generated by machine learning based on the position Ps of the spool 54 acquired in advance and the electrical information Je related to the solenoid 44 corresponding to the position Ps. The estimation unit 30 estimates the position Ps of the spool 54 by using the position estimation model 32*m*. In this case, estimation uses the position estimation model generated by machine learning in advance and so is advantageous to increase the speed of data processing and provides high estimation precision.

In this embodiment, the estimation unit 30 estimates the position Ps of the spool 54 based on the result of comparison between the frequency component Ch of the high-frequency signal Sh extracted by the digital filter from the electrical information Je and the high-frequency signal Sh. In this case, the position can be estimated based on the amplitude difference between the frequency component Ch and the high-frequency signal Sh. Therefore, the estimation precision is inhibited from dropping due to impact of environmental changes such as distortion in the waveform, temperature change, and time-dependent change.

In this embodiment, the high-frequency signal Sh is a sinusoidal wave or a rectangular wave. In this case, the wave is not easily affected by external random noise so that the estimation precision is inhibited from dropping due to external noise.

In this embodiment, the electrical information Je related to the solenoid 44 includes the inverse electromotive force Eb of the solenoid 44. In this case, information on the moving speed of the movable part 48 can be extracted from the inverse electromotive force Eb so that the condition of deterioration of the electromagnetic valve 52 can be known by referring to the variation of the moving speed.

Figure 10:
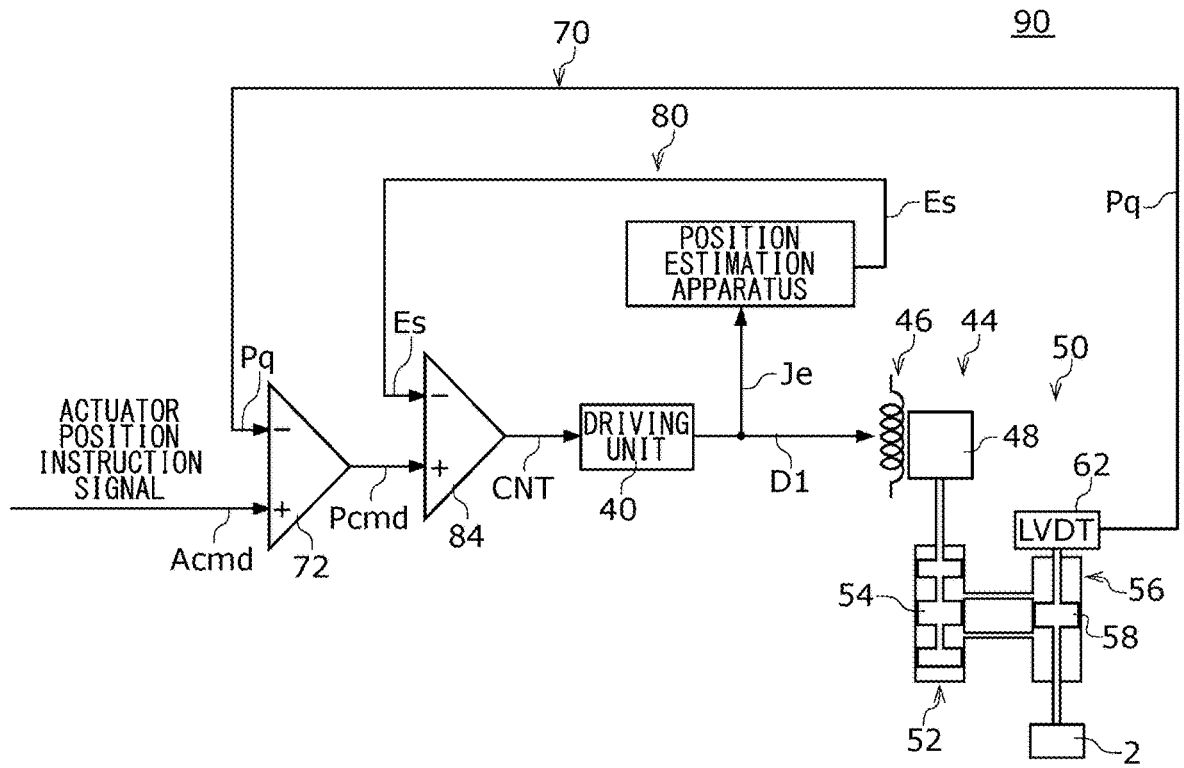
FIG. 10 is a block diagram showing an example of the position control system of the actuator apparatus of FIG. 1.

A description will now be given of a position control system 90 of the actuator apparatus 10 provided with the position estimation apparatus 100 of this embodiment. FIG. 10 is a block diagram showing the position control system 90 of the actuator apparatus 10. The position control system 90 shown in FIG. 10 includes a first feedback loop 70 and a second feedback loop 80. The first feedback loop 70 feeds back a position Pq of the piston 58 of the hydraulic actuator 56 of the actuator apparatus 10. The second feedback loop 80 feeds back the estimation result Es of the spool position Ps of the electromagnetic valve 52.

The first feedback loop 70 includes the hydraulic actuator 56, an LVDT 62, and a first error amplifier 72. The LVDT 62 senses the position Pq of the piston 58. The first error amplifier 72 amplifies a difference (piston position error) between a position instruction signal Acmd and the position Pq of the piston 58 and supplies a spool position instruction signal Pcmd to the driving unit 40. The position instruction signal Acmd of the actuator is supplied from a superior control system. The first feedback loop 70 controls the position Pq of the piston 58 to follow the position instruction signal Acmd.

The second feedback loop 80 of the position control system 90 includes the position estimation apparatus 100, the driving unit 40, the electromagnetic valve 52, and a second error amplifier 84. The second error amplifier 84 amplifies a difference (spool position error) between the spool position instruction signal Pcmd and the estimation result Es and supplies the control signal CNT to the driving unit 40. The driving unit 40 drives the electromagnetic valve 52 based on the control signal CNT. The electromagnetic valve 52 is driven by the driving unit 40 to drive the hydraulic actuator 56. The second feedback loop 80 controls the estimation result Es to follow the instruction signal Pcmd.

A description will now be given of the second-fourth embodiments. In the drawings and description of the second-fourth embodiments, constituting elements and members identical or equivalent to those of the first embodiment shall be denoted by the same reference numerals. Duplicative explanations are omitted appropriately and features different from those of the first embodiment will be highlighted.

Second Embodiment

The second embodiment of the present invention relates to the aircraft hydraulic actuator apparatus 10. The actuator apparatus 10 includes the hydraulic actuator 56 for driving the driven body 2 of the airplane 1, the electromagnetic valve 52 for controlling the hydraulic actuator 56, the supplying unit 20 that supplies the high-frequency signal Sh to the solenoid 44 for driving the spool 54 of the electromagnetic valve 52, the acquisition unit 24 that acquires the electrical information Je related to the solenoid 44 supplied with the high-frequency signal Sh, and the estimation unit 30 that estimates the position of the spool 54 based on the result of comparison between the electrical information Je acquired by the acquisition unit 24 and the high-frequency signal Sh supplied from the supplying unit 20. The actuator apparatus 10 may be a system.

The second embodiment provides the same advantage and benefit as the first embodiment. The second embodiment also provides the aircraft hydraulic actuator apparatus with improved reliability since a position sensor is not necessary and the number of components is small.

Third Embodiment

Figure 11:
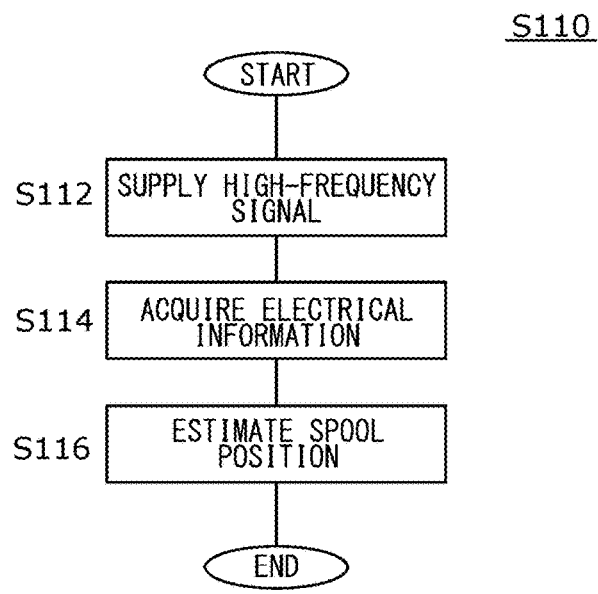
FIG. 11 is a flowchart showing an example of a spool position estimation method for an electromagnetic valve.

The third embodiment of the present invention relates to a spool position estimation method S110 for the electromagnetic valve 52. FIG. 11 is a flowchart showing an example of the position estimation method S110. The spool position estimation method S110 includes a step S112 of supplying the high-frequency signal Sh to the solenoid 44 for driving the spool 54 of the electromagnetic valve 52, an acquisition step S114 of acquiring the electrical information Je related to the solenoid 44 supplied with the high-frequency signal Sh, and a step S116 of estimating the position of the spool 54 based on the result of comparison between the electrical information Je acquired in step S114 and the high-frequency signal Sh supplied.

The third embodiment provides the same advantage and benefit as the first embodiment.

Fourth Embodiment

The fourth embodiment of the present invention relates to a spool position estimation program (computer program) for an electromagnetic valve. The position estimation program according to this embodiment causes a computer to execute a process including: a step S112 of supplying the high-frequency signal Sh to the solenoid 44 for driving the spool 54 of the electromagnetic valve 52, an acquisition step S114 of acquiring the electrical information Je related to the solenoid 44 supplied with the high-frequency signal Sh, and a step S116 of estimating the position of the spool 54 based on the result of comparison between the electrical information Je acquired in step S114 and the high-frequency signal Sh supplied.

The functions of the position estimation program according to this embodiment may be installed in a storage (not shown) of the position estimation apparatus 100 as an application program in which a plurality of modules corresponding to the functional blocks of the position estimation apparatus 100 are implemented. The position estimation program may be read into a main memory of a processor (e.g., a CPU) of a computer forming the estimation unit 30 of the position estimation apparatus 100.

The fourth embodiment provides the same advantage and benefit as the first embodiment.

Exemplary embodiments of the present disclosure are described above in detail. The embodiments described above are merely specific examples of practicing the present invention. The details of the embodiments shall not be construed as limiting the technical scope of the present invention. A number of design modifications such as modification, addition, deletion, etc. of constituting elements may be made to the extent that they do not depart from the idea of the invention defined by the claims. Although the details subject to such design modification are described in the embodiments by using notations such as "of this embodiment" and "in this embodiment", details not referred to as such are also subject to design modification.

[Variations]

A description will now be given of variations. In the drawings and description of the variations, constituting elements and members identical or equivalent to those of the embodiments shall be denoted by the same reference numerals. Duplicative explanations are omitted appropriately and features different from those of the embodiments will be highlighted.

In the description of the embodiments, the valve unit 50 is shown as including the electromagnetic valve 52 and the hydraulic actuator 56 by way of example. However, the present invention is not limited to this configuration. The electromagnetic valve 52 may be a solenoid valve having any of various publicly known configurations. For example, the valve unit 50 may not have a hydraulic actuator, and the electromagnetic valve 52 may be a simple solenoid valve such as a 4-port single-action electromagnetic valve and a 5-port single-action electromagnetic valve.

In the description of the embodiments, the spool position is shown as being estimated by using the correspondence relationship table 32d or the position estimation model 32m. However, the present invention is not limited to this configuration. For example, the spool position may be estimated by setting a predetermined threshold value and finding whether the comparison result such as the amplitude difference Cp exceeds the threshold value.

In the description of the embodiments, the correspondence relationship table 32d is shown as including data corresponding to three or more spool positions by way of example. However, the present invention is not limited to this configuration. For example, the correspondence relationship table 32d may include data corresponding to two or fewer spool positions.

In the description of the embodiments, the correspondence relationship table 32d is shown as including data for the amplitude difference Cp and the inverse electromotive force Eb corresponding to the spool position by way of example. However, the present invention is not limited to this configuration. For example, the correspondence relationship table may not include data for the amplitude difference or the inverse electromotive force.

In the description of the embodiments, the position estimation model 32m is shown as estimating the position based on three input data items including the amplitude difference Cp, the inverse electromotive force Eb, and the driving current Ic by way of example. However, the present invention is not limited to this configuration. The embodiments are non-limiting as to the input data, and the position estimation model may estimate the position based on two or fewer or four or more input data items.

In the description of the embodiments, the valve unit 50 is shown as including the electromagnetic valve 52 and the hydraulic actuator 56 by way of example. However, the present invention is not limited to this configuration. It is not essential to include the hydraulic actuator.

In the description of the embodiments, the estimation unit 30 is shown as estimating the spool position based on the result of comparison between the frequency component Ih of the driving current Ic and the high-frequency signal Sh by way of example. However, the present invention is not limited to this configuration. For example, the estimation unit 30 may estimate the spool position based on the result of comparison between the inverse electromotive force Eb and the high-frequency signal Sh.

In the description of the embodiments, the estimation unit 30 is shown as estimating the spool position based on the result of comparison between the amplitude of the frequency component Ih of the driving current Ic and the amplitude of the high-frequency signal Sh. However, the present invention is not limited to this configuration. The estimation unit may estimate the spool position based on the result of comparison (phase error) between the phase of the frequency component Ih and the phase of the high-frequency signal Sh.

In the description of the embodiments, the coil 46 is shown as being driven by the voltage from the driving unit 40 by way of example. However, the present invention is not limited to this configuration. For example, the coil may be driven by a current by using a current follower amplifier, which may be controlled to cause a constant current to flow in the coil. In this case, the coil voltage varies in accordance with the variation of the coil inductance. It is therefore possible to estimate the spool position based on the variation of the coil voltage.

The variations described above provide the same advantage and benefit as the first embodiment.

Any combination of an embodiment and a variation described above will also be useful as an embodiment of the present invention. A new embodiment created by a combination will provide the combined advantages of the embodiment and the variation as combined.

What is claimed is:

1. A spool position estimation apparatus characterized by comprising:
   a supplying unit that supplies a high-frequency signal to a solenoid for driving a spool of an electromagnetic valve;
   an acquisition unit that acquires an inverse electromotive force of the solenoid supplied with the high-frequency signal;
   an estimation unit that estimates a position of the spool based on a result of comparison between the inverse electromotive force acquired by the acquisition unit and the high-frequency signal directly supplied from the supplying unit; and
   a driving unit that outputs a first driving voltage on which the high-frequency signal is superimposed to produce a second driving voltage to drive the solenoid,
   wherein the solenoid includes a coil and a movable part which has a moving path along the coil,
   wherein the second driving voltage in which the high-frequency signal and the first driving voltage are superimposed is directly supplied to the coil of the solenoid, and
   wherein the inverse electromotive force of the coil of the solenoid is acquired by the acquisition unit.

2. The spool position estimation apparatus according to claim 1, characterized by further comprising:
   a storage unit that stores correspondence relationship between the position of the spool acquired in advance and the electrical information related to the solenoid corresponding to the position, wherein the estimation unit estimates the position of the spool by using the correspondence relationship.

3. The spool position estimation apparatus according to claim 1, characterized by further comprising:

a storage unit that stores a spool position estimation model generated by machine learning based on the position of the spool acquired in advance and the electrical information related to the solenoid and corresponding to the position, wherein the estimation unit estimates the position of the spool by using the spool position estimation model.

4. The spool position estimation apparatus according to claim 1, characterized in that the estimation unit estimates the position of the spool based on a result of comparison between a frequency component of the high-frequency signal extracted by a digital filter from the electrical information and the high-frequency signal.

5. The spool position estimation apparatus according to claim 1, characterized in that the high-frequency signal is a sinusoidal wave or a rectangular wave.

6. An aircraft hydraulic actuator apparatus characterized by comprising:

a hydraulic actuator for driving a driven body of an airplane;

an electromagnetic valve for controlling the hydraulic actuator;

a supplying unit that supplies a high-frequency signal to a solenoid for driving a spool of the electromagnetic valve;

an acquisition unit that acquires an inverse electromotive force of the solenoid supplied with the high-frequency signal;

an estimation unit that estimates a position of the spool based on a result of comparison between the inverse electromotive force acquired by the acquisition unit and the high-frequency signal directly supplied from the supplying unit; and a driving unit that outputs a first driving voltage on which the high-frequency signal is superimposed to produce a second driving voltage to drive the solenoid, wherein the solenoid includes a coil and a movable part which has a moving path along the coil, wherein the second driving voltage in which the high-frequency signal and the driving voltage are superimposed is directly supplied to the coil of the solenoid, and wherein the inverse electromotive force of the coil of the solenoid is acquired by the acquisition unit.

7. A spool position estimation method characterized by comprising:

supplying a high-frequency signal to a solenoid for driving a spool of an electromagnetic valve;

acquiring an inverse electromotive force of the solenoid supplied with the high-frequency signal;

estimating a position of the spool based on a result of comparison between the inverse electromotive force acquired and the high-frequency signal supplied; and outputting a first driving voltage on which the high-frequency signal is superimposed to produce a second driving voltage to drive the solenoid, wherein the solenoid includes a coil and a movable part which the coil has a moving path along the coil, wherein the second driving voltage in which the high-frequency signal and the driving voltage are superimposed is directly supplied to the coil of the solenoid, and wherein the inverse electromotive force of the coil of the solenoid is acquired by the acquisition unit.

8. A non-transitory computer-readable medium storing program storing an instruction to:

supply a high-frequency signal to a solenoid for driving a spool of an electromagnetic valve;

acquire an inverse electromotive force of the solenoid supplied with the high-frequency signal;

estimate a position of the spool based on a result of comparison between the inverse electromotive force acquired and the high-frequency signal supplied; and output a first driving voltage on which the high-frequency signal is superimposed to produce a second driving voltage to drive the solenoid wherein the solenoid includes a coil and a movable part which has a moving path along the coil, wherein the second driving voltage in which the high-frequency signal and the driving voltage are superimposed is directly supplied to the coil of the solenoid, and wherein the inverse electromotive force of the coil of the solenoid is acquired by the acquisition unit.

* * * * *